United States Patent [19]

Saito

[11] Patent Number: 4,466,032
[45] Date of Patent: Aug. 14, 1984

[54] FLEXIBLE DISC RECORDING AND/OR REPRODUCING APPARATUS

[75] Inventor: Etsuro Saito, Ayase, Japan

[73] Assignee: Sony Corporation, Tokyo, Japan

[21] Appl. No.: 335,347

[22] Filed: Dec. 29, 1981

[30] Foreign Application Priority Data

Dec. 31, 1980 [JP] Japan .............................. 55/187534
Jun. 16, 1981 [JP] Japan ........................... 56/88563[U]
Sep. 30, 1981 [JP] Japan .............................. 56/155575

[51] Int. Cl.³ .................... G11B 5/016; G11B 15/60; G11B 5/82; G11B 5/012
[52] U.S. Cl. ..................................... 360/99; 360/97; 360/130.34; 360/135
[58] Field of Search ...................... 360/93, 95, 97, 98, 360/99, 135, 137, 86, 130.34, 104, 105; 242/195, 55.19 A

[56] References Cited

U.S. PATENT DOCUMENTS

| | | | |
|---|---|---|---|
| 3,879,757 | 4/1975 | Elliott | 360/130.34 |
| 3,932,891 | 1/1976 | Horvath | 360/93 |
| 4,001,888 | 1/1977 | Morgan | 360/130.34 |
| 4,069,508 | 1/1978 | Bilek | 360/135 |
| 4,149,207 | 4/1979 | Porter | 360/99 |
| 4,232,870 | 11/1980 | Iemenschot | 360/97 |
| 4,296,448 | 10/1981 | Garcia | 360/135 |
| 4,318,144 | 3/1982 | Galvagni | 360/86 |
| 4,379,315 | 4/1983 | Schvler | 360/105 |
| 4,396,965 | 8/1983 | De Moss | 360/99 |

Primary Examiner—Robert Martin Kilgore
Attorney, Agent, or Firm—Lewis H. Eslinger; Alvin Sinderbrand

[57] ABSTRACT

In an apparatus for recording and/or reproducing signals on a flexible disc which is freely rotatable between opposed walls of a substantially flat cartridge, a holding device is movable in respect to a base member from a cartridge receiving position to a loaded position at which a cartridge in such holding device is operatively disposed for engagement of the disc by a drive extending from the base member through first openings in the cartridge walls centered in respect to the disc for rotating the latter while a head mounted on the base member extends through second openings in the cartridge walls to record or reproduce signals on a surface of the disc. A guide plate mounted on the base member has an aperture through which the head extends and a first disc guiding surface surrounding such aperture, and a positioning plate is mounted on the holding device and has a second disc guiding surface which, in the loaded position, is in parallel, spaced confronting relation to the first disc guiding surface. When a cartridge is operatively disposed, the guide and positioning plates extend into the second openings in the cartridge walls so that the first and second disc guiding surfaces position the rotated flexible disc therebetween in the region of the head.

27 Claims, 13 Drawing Figures

FLEXIBLE DISC RECORDING AND/OR REPRODUCING APPARATUS

BACKGROUND OF THE INVENTION

1. Field of the Invention

This invention relates generally to a flexible disc recording and/or reproducing apparatus, and more particularly is directed to an arrangement for accurately positioning a flexible rotated disc while an information signal, such as, a video or still picture signal, is being recorded or reproduced on a surface of the disc by means of a magnetic head or heads.

2. Description of the Prior Art

Figure 1A:
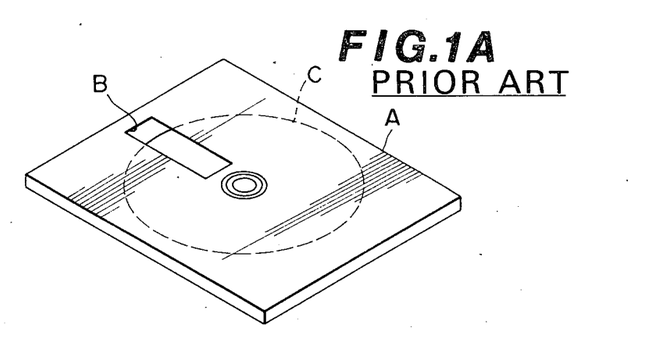
FIG. 1A is a perspective view of the previously mentioned jacket or cartridge containing a flexible magnetic disc or relatively large diameter in accordance with the prior art.
Figure 1B:
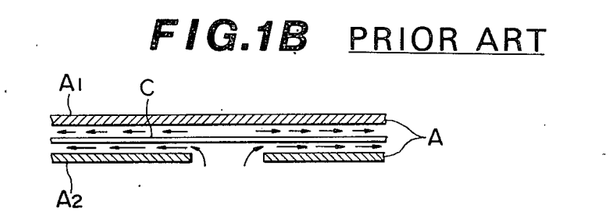
FIG. 1B is a schematic, fragmentary sectional view of the middle portion of the jacket and flexible disc shown on FIG. 1A.

Apparatus has been provided in which a video or other information signal is recorded and/or reproduced by a magnetic head in a substantially circular record track formed on a flexible magnetic disc while the latter is rotated at a relatively high speed, for example, a speed of 1800 or 3600 RPM. The flexible magnetic disc used for such recording or reproducing may be extremely thin, for example, it may have a thickness of about 40 $\mu$m. Therefore, as shown on FIG. 1A, the flexible magnetic disc C is usually contained in a jacket or cartridge casing A for preventing crumpling, folding or other damage to the relatively fragile disc, particularly when not in use. The jacket or cartridge casing A has central openings in its opposite walls at which the center of the disc can be engaged by a drive for effecting the high speed rotation of the disc while contained in the jacket or cartridge which is further provided with a window B through which the magnet head may contact the disc surface for recording or reproducing the information signal thereon. In existing flexible disc recording and/or reproducing apparatus, the disc has a relatively large diameter, for example, of the order of 30 $\mu$m. Therefore, when the flexible disc C is rotated at a relatively high speed within the jacket or cartridge casing A as mentioned above, the resulting centrifugal forces are relatively large to urge the flexible disc to maintain a flat configuration in a plane normal to the rotational axis. Further, the high speed rotation of the flexible disc causes the generation of air flows or films moving radially outward from the center of the rotated disc C toward the periphery between the disc surfaces and the adjacent walls $A_1$ and $A_2$ of the jacket or cartridge casing A, as indicated by the arrows on FIG. 1B. As a result of the foregoing, a magnetic head may be pressed against the surface of the rotated flexible disc C without substantial movement of the latter away from the head due to the stretching of the disc. Therefore, in the case of a flexible disc of relatively large diameter, the attainment of stable and reliable contact of the magnetic head with the disc surface does not present a serious problem.

However, in order to facilitate the handling of a jacket or cartridge casing containing a flexible magnetic disc, for example, to permit the convenient storage or mailing thereof, it is desirable to reduce the diameter of the flexible disc. When the diameter of the disc is reduced sufficiently for the foregoing purposes, it is difficult to attain adequate air flows and centrifugal forces acting on the flexible rotated disc for ensuring the reliable and stable contact of the magnetic head with the disc surface.

OBJECTS AND SUMMARY OF THE INVENTION

Accordingly, it is an object of this invention to provide a flexible disc recording and/or reproducing apparatus for use with a flexible disc of relatively small diameter, and which maintains stable and reliable contact of a magnetic head or heads with the disc surface.

Another object is to provide a flexible disc recording and/or reproducing apparatus, as aforesaid, in which stable contact of a head or heads with the disc surface for recording and/or reproducing information signals on the flexible disc can be effected with the disc within its jacket or cartridge.

Still another object of the invention is to provide a flexible disc recording and/or reproducing apparatus, as aforesaid, in which the movements of the jacket or cartridge containing a flexible disc to and from its operative position can be easily effected without interference from the elements provided for ensuring reliable and stable contact of the magnetic head or heads with the disc surface during recording and/or reproducing operations.

In accordance with an aspect of this invention, a flexible disc recording and/or reproducing apparatus having head means for recording and/or reproducing signals on a surface of the flexible disc while the latter is rotated by a drive means is further provided with a guide plate having a first disc guiding surface at least adjacent to the head means, for example, in surrounding relation to the latter, and confronting the surface of the rotated flexible disc, and a positioning plate having a second disc guiding surface and which is mounted to be operatively disposed with such second disc guiding surface in parallel, spaced confronting relation to the first disc guiding surface for positioning the rotated flexible disc therebetween in the region of the head means.

In a desirable embodiment of the invention, spacing means are associated with the above-mentioned guide and positioning plates for precisely determining the spacing between the first and second disc guiding surfaces when the positioning plate is operatively disposed, and such spacing means preferably includes adjustable screws for varying the spacing between the guiding surfaces.

When the flexible disc is desirably contained in a substantially flat cartridge having opposed walls between which the disc is freely rotatable, such opposed walls have first aligned openings therein substantially centered in respect to the disc for the engagement therethrough of the drive means with the disc, and the opposed walls of the cartridge further have second aligned openings extending, in the radial direction of the disc, at least between inner and outer effective limits of the recording surface of the disc. For use with a flexible disc in a cartridge, as above, the recording and/or reproducing apparatus according to this invention desirably has its drive means extending from a base member for engagement with the disc through the first openings of the cartridge when the latter is in its operative position in respect to the base member, and the head means and associated guide plate are mounted on the base member, while a cartridge holding means is movable in respect to the base member between a cartridge receiving position and a loaded position in which a cartridge in such holding means is disposed in the desired operative position. Further, the positioning plate is mounted on the cartridge holding means so that the second disc guiding surface, in the loaded position of the holding means, will be in the desired parallel, spaced confronting relation to the first disc guiding surface on the guide plate. Thus, when the cartridge is disposed in its operative position by movement of the cartridge holding means to its loaded position, the guide and positioning plates will extend into the second openings in the walls of the cartridge with the first disc guiding surface confronting the surface of the rotated flexible disc and cooperating with the second disc guiding surface for positioning the rotated flexible disc therebetween in the region of the head means.

The above, and other objects, features and advantages of the invention, will be apparent in the following detailed description of illustrative embodiments thereof which is to be read in connection with the accompanying drawings, in which like reference numerals are used to identify the same or corresponding parts in the several views of the drawings.

DESCRIPTION OF THE PREFERRED EMBODIMENTS

Figure 2:
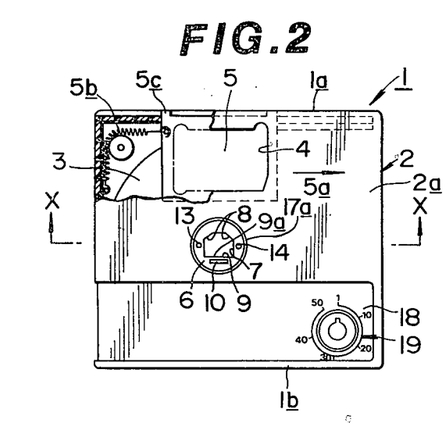
FIG. 2 is a plan view of a jacket or cartridge containing a flexible magnetic disc, which is shown partly broken away and which is preferably used in a recording and/or reproducing apparatus according to this invention.
Figure 3:
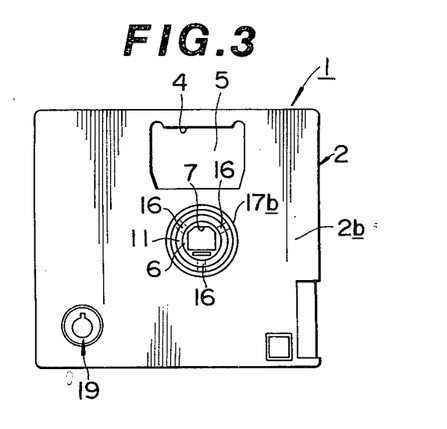
FIG. 3 is a plan view of the jacket or cartridge shown on FIG. 2, but as viewed from the opposite side thereof.
Figure 4:
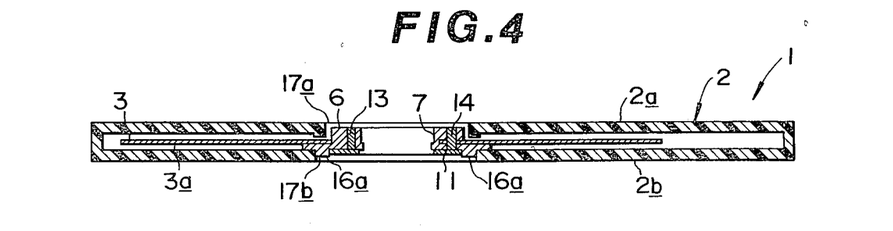
FIG. 4 is an enlarged sectional view taken along the line X—X on FIG. 2.

Referring first to FIGS. 2, 3 and 4, it will be seen that a cartridge 1 intended for use in a flexible disc recording and/or reproducing apparatus according to this invention comprises a substantially flat rectangular jacket or casing 2 which may be molded of a suitable plastic and has opposed walls 2a and 2b between which a flexible disc 3 of magnetic material is freely rotatable. The disc 3 is of a suitably small diameter, for example, no more than about 50 mm, so that jacket 2 can be of correspondingly small size, for example measuring 60 mm by 54 mm by 3 mm, for convenience of handling, storage and transmission, as by mail, and for use in a very compact recording and/or reproducing apparatus which may, for example, be part of a still picture camera which is not substantially larger than a conventional 35 mm single-lens reflex camera. The opposed walls 2a and 2b of jacket 2 have aligned openings or windows 4 therein which extend, in the radial direction of disc 3, at least to the inner and outer effective limits of a recording surface 3a on the disc. A door member 5 straddles disc 3 and is slidable along an edge portion of jacket 2 with portions of door member 5 disposed against the inner surfaces of walls 2a and 2b for slidable movement in the direction of the arrow 5a on FIG. 2 from the illustrated closed position to an opened position in which door member 5 clears windows 4. A tension spring 5b may be connected to door member 5 for urging the letter to its closed position, and a projection 5c extends from door member 5 and may be acted upon, as hereinafter described in detail, for opening door member 5 upon the insertion of cartridge 1 into a recording and/or reproducing apparatus. When door member 5 is thus opened, one or more magnetic heads can extend through one of the windows 4 for magnetically recording an information signal, for example, representing a still image or picture, in a selected one of concentric circular record tracks on surface 3a (FIG. 4) of the disc.

A hub 6 is provided at the center of disc 3 and has a hole 7 extending therethrough for receiving a drive shaft (not shown on FIGS. 2-4). The hole 7 is preferably non-circular so as to define a pair of relatively angled positioning surfaces 8 adapted to tangentially engage the circular periphery of a drive shaft for centering rotary disc 3 relative to the axis of the drive shaft. A resilient chordal element 9 extends across hole 7 at the side of the latter opposite positioning surfaces 8. Such chordal element 9 is backed up by an elongated hole 10 extending along element 9 at the side of the latter opposite its surface 9a facing toward positioning surfaces 8. The described hub 6 can be easily molded of a suitable plastic material which further lends elasticity to the resilient element 9. The hold 7 is dimensioned so that, when a drive shaft is inserted therein, resilient element 9 is flexed away from positioning surfaces 8 by the shaft, whereby to maintain firm contact of surfaces 8 with the outer periphery of the drive shaft.

The hub 6 is further shown to have an annular magnetic member 11 suitably mounted against its lower surface. A magnetic detecting pin 13 for use in detecting the rotational phase or position of disc 3, as hereinafter described in detail, and a non-magnetic balancing pin 14 of substantially the same weight as pin 13 are embedded in hub 6 at diametrically opposed locations. At least three supports or feet 16 extend from the lower surface of hub 6 at equally angularly spaced apart locations which are radially outward in respect to annular magnetic member 11. The bottom surfaces 16a of supports 16 project slightly from the underside of hub 6 and define a reference level with respect to the magnetic recording surface 3a of disc 3. Walls 2a and 2b of jacket 2 have central openings 17a and 17b in which hub 6 is loosely rotatable.

At the side of jacket 2 which faces upwardly in use, cartridge 1 is provided with a circularly arranged scale 18 cooperating with a suitable device 19 for indicating or displaying the number of the circular record track on disc 3 in which an information signal is being recorded.

Figure 5:
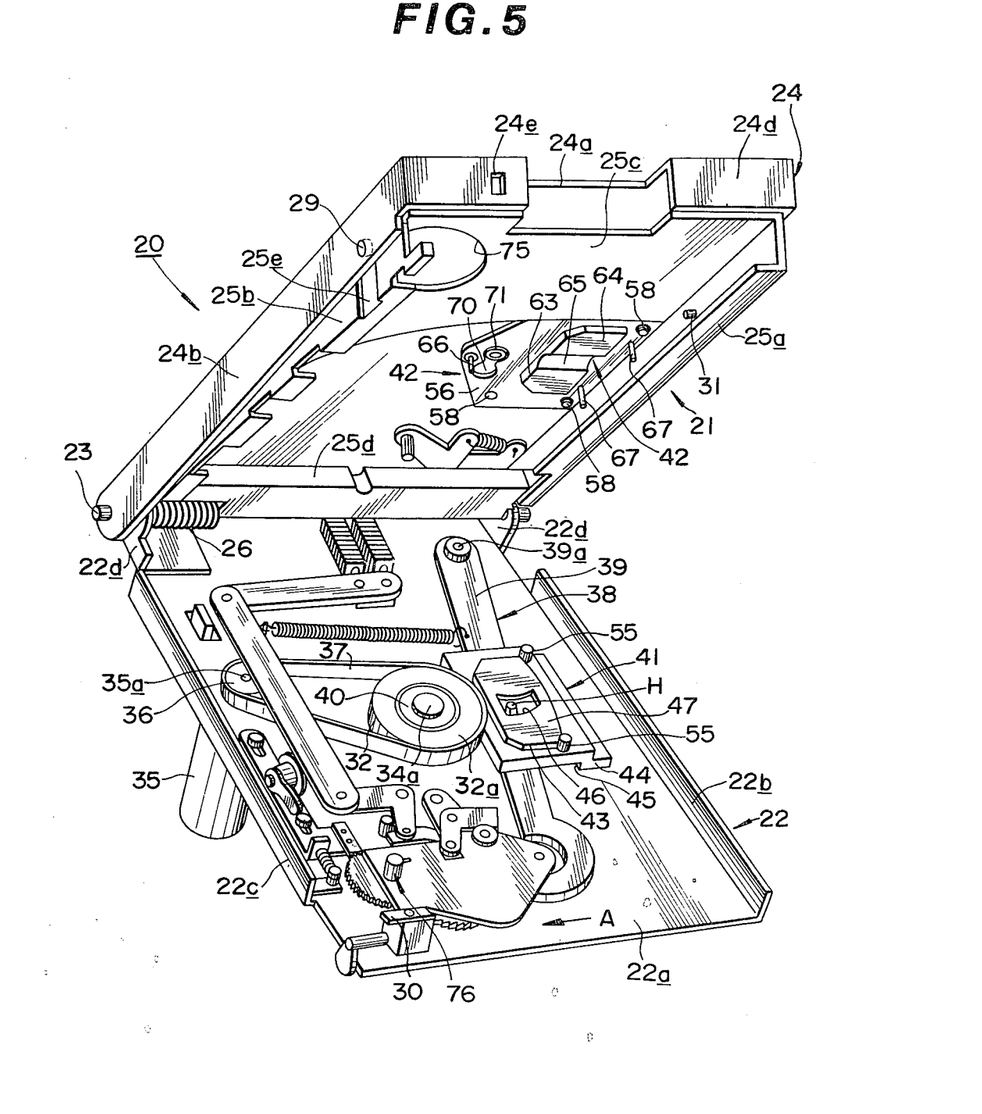
FIG. 5 is a perspective view of a flexible disc recording and/or reproducing apparatus according to this invention, and which is shown with a cartridge holding device thereof in its receiving position for the insertion or removal of a jacket or cartridge containing a flexible disc, as in FIGS. 2-4.

Referring now to FIG. 5, it will be seen that a flexible disc recording and/or reproducing apparatus 20 according to an embodiment of this invention which is particularly suitable for use with the previously described cartridge 1 comprises a cartridge holding assembly 21 which is movable relative to a base member 22 between a receiving position, shown on FIG. 5, and a loaded position close to base member 22 and in which a cartridge is operatively disposed for the recording and/or reproducing of magnetic signal information on surface 3a of its disc 3. Base member 22 is shown to be in the form of a base plate 22a having flanges 22b and 22c directed upwardly along major portions of its opposite side edges, and lugs 22d also directed upwardly from the opposite sides of plate 22a adjacent the back end of the latter for supporting a laterally directed pivot shaft 23 for holding assembly 21.

Holding assembly 21 is shown to include a substantially rectangular cover member 24 in the form of a plate 24a from which flanges 24b, 24c and 24d depend along the opposite sides and the front, respectively, of the cover member (FIGS. 5 and 8), and a receptacle frame member 25 which is dimensioned to fit within cover member 24. Frame member 25 includes side portions in the form of channels 25a and 25b opening at their forward ends and laterally toward each other, a connecting portion 25c extending laterally between the forward portions of channels 25a and 25b at the top of the latter, and a cross-piece 25d extending between the back portions of channels 25a and 25b.

Cover member 24 and receptacle frame member 25 are mounted, at their back ends, for pivotal movements about shaft 23 relative to each other, and also relative to base member 22. A torsion spring 26 (FIG. 5) is provided around shaft 23 for urging frame member 25 upwardly relative to base member 22 to a cartridge receiving position of holding assembly 21 shown in FIG. 5. A leaf spring 27 (FIG. 8) is secured at one end, as at 28, to the underside of the plate 24a of cover member 24 and bears, at its free end, against connecting portion 25c of receptacle frame member 25 for urging cover member 24 upwardly relative to frame member 25. The upward movement of cover member 24 relative to frame member 25 is limited to the extended position shown on FIG. 5, for example, by a pin 29 extending inwardly from flange 24b of cover member 24 and engageable with the upper closed end of a groove 25e formed in the outer surface of the adjacent channel 25b of frame member 25. When holding assembly 21 is moved downwardly to a loaded position relative to base member 22, a keeper or cutout 24e in the forward flange 24d of cover member 24 is engageable by a latch 30 on base member 22. In such loaded position, the engagement of receptacle frame member 25 against base member 22 causes frame member 25 to be fully nested or retracted within cover member 24 against the force of spring 27.

When holding assembly 21 is in its receiving position, at which frame member 25 is extended downwardly, at its front end, relative to cover member 24, cartridge 1 can be slidably inserted in, or withdrawn from receptacle frame member 25 with the opposed longitudinal sides of the cartridge, indicated at 1a and 1b on FIG. 2, being slidably received in channels 25a and 25b, respectively. A door-opening abutment or lug 31 (FIG. 5) projects into channel 25a and is engageable with projection 5c on door member 5 of cartridge 1 so that, as the latter is slidably inserted into receptacle frame member 25, door-opening lug 31 moves door member 5; in the direction of the arrow 5a on FIG. 2 from its closed position to its opened position. The slidable insertion of cartridge 1 into receptacle frame member 25 is limited by engagement of the back end of cartridge 1 with crosspiece 25d and, at that time, the forward end of cartridge 1 clears flange 24d of cover member 24 so that frame member 25 with the cartridge 1 held therein can then nest within cover member 24 upon movement of holding assembly 21 to its loaded position for operatively positioning the cartridge.

Figure 6:
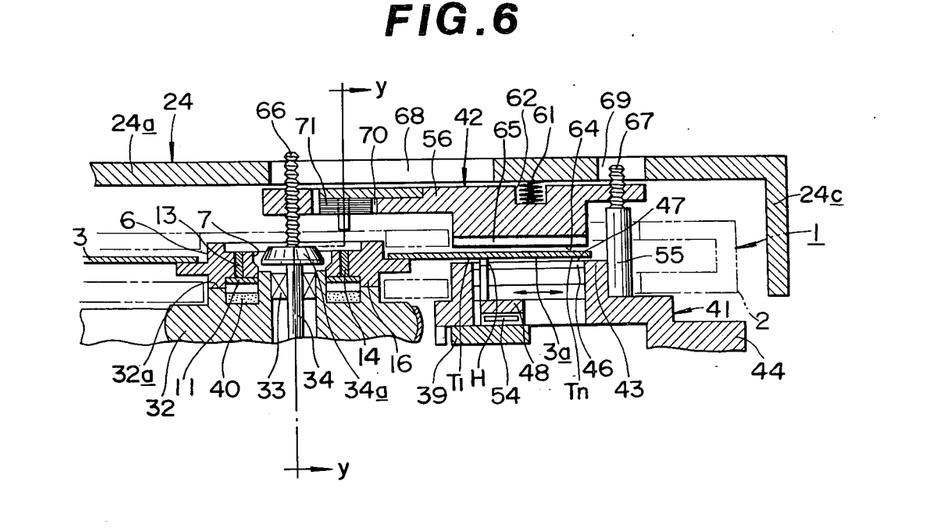
FIG. 6 is an enlarged fragmentary sectional view of those parts in the apparatus of FIG. 5 which are provided for driving the flexible disc and for guiding the latter in the region of a magnetic head during the recording and/or reproducing of information signals thereon.
Figure 7:
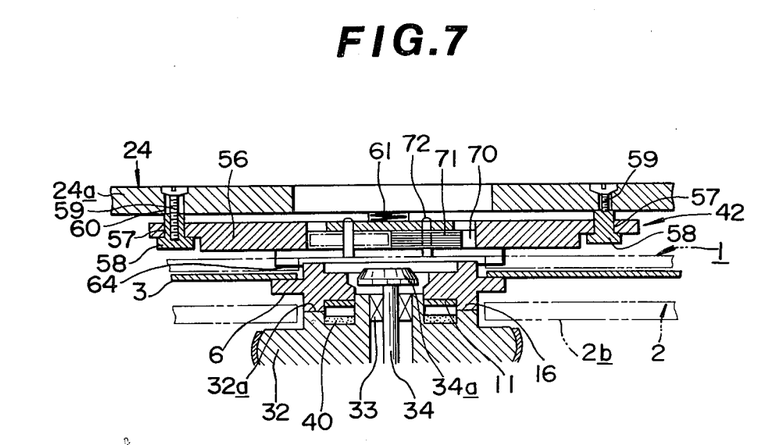
FIG. 7 is a fragmentary sectional view taken along the line Y—Y on FIG. 6.

The apparatus 20 to which the invention is applied is further shown to include a turntable 32, which also functions as a fly wheel, and which is rotatably mounted by way of a ball bearing 33 on a stationary shaft 34 projecting upwardly from base member 22 at a location corresponding to hub 6 of cartridge 1 when the latter is in its operative position relative to base member 22 (FIGS. 6 and 7). An electric motor 35 depends from base member 22 (FIG. 5) and has its motor shaft 35a extended above base member 22 and provided with a drive pulley 36 for driving a belt 37 which extends around turntable 32 for rotatably driving the latter. Also mounted on base member 22 is a head actuating device 38, the details of which form no part of the present invention, other than to note that such device includes a head driving arm 39 pivoted, at 39a, on base member 22 and on which a magnetic recording and/or reproducing head H is mounted, as hereinafter described in detail, so that angular displacements of arm 39 are effective to displace head H in the radial direction of disc 3 in the operatively positioned cartridge. Such displacements of head H in the radial direction of disc 3 are, of course, effective to change the circular track on surface 3a of the disc in which head H is operative to record or reproduce an information signal while disc 3 is rotated at high speed in response to the rotation of turntable 32.

When cartridge 1 is operatively positioned in response to movement of holding assembly 21 to its loaded position, a head 34a on shaft 34 enters hole 7 of hub 6 and is pressed by elastic element 9 against positioning surfaces 8 for accurately centering disc 3 in respect to the axis of shaft 34. Further, an annular, upwardly facing surface 32a on turntable 32 which is precisely formed in a plane perpendicular to the axis of shaft 34 is engaged by supports or feet 16 of hub 6 so as to accurately locate the plane of rotation of disc 3 normal to the axis of rotation of turntable 32. In order to constrain disc 3 to rotate with turntable 32 when the latter is driven by motor 35, an annular magnet 40 is recessed in the upper surface of turntable 32 concentric with the center of the latter so as to be proximate to annular magnetic member 11 at the bottom of hub 6 when cartridge 1 is in its operative position. By reason of the foregoing, magnet 40 axially attracts hub 6 to cause feet 16 to bear against surface 32a of the turntable, and magnet 40 also rotatably couples hub 6, and hence disc 3, to turntable 32 for rotation with the latter.

In accordance with the present invention, the apparatus 20 is shown to be provided with a guide member 41 mounted on base member 22 and associated with magnetic recording and/or reproducing head or heads H so as to be adapted, when holding assembly 21 is in its loaded position, to cooperate with a positioning member 42 depending from cover member 24 for stabilizing the contact of head or heads H with the surface 3a of rotated flexible disc 3.

Figure 8:
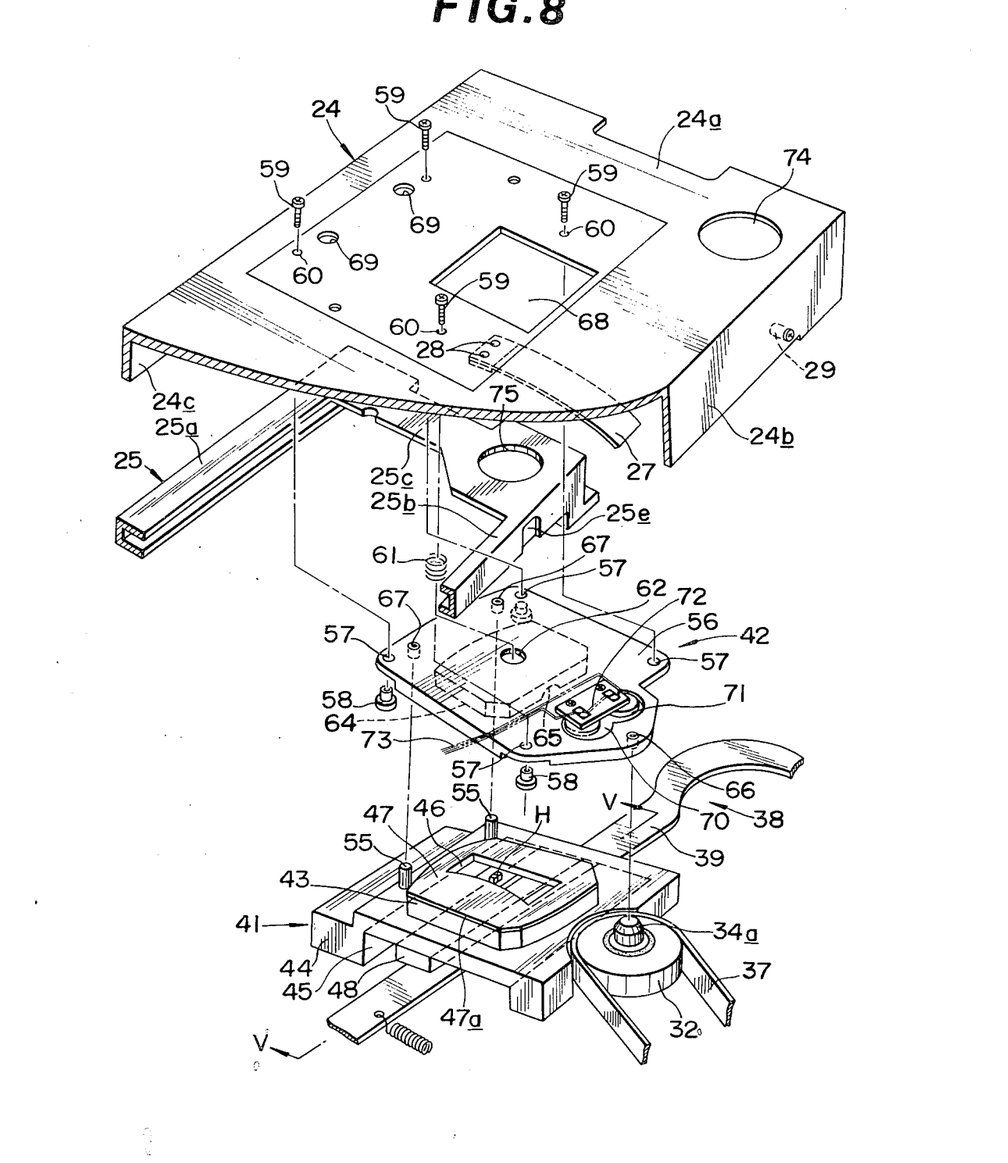
FIG. 8 is an exploded perspective view of those parts of the apparatus shown on FIG. 5 which are particularly pertinent to the present invention, and some of which are shown partly broken away.
Figure 9:
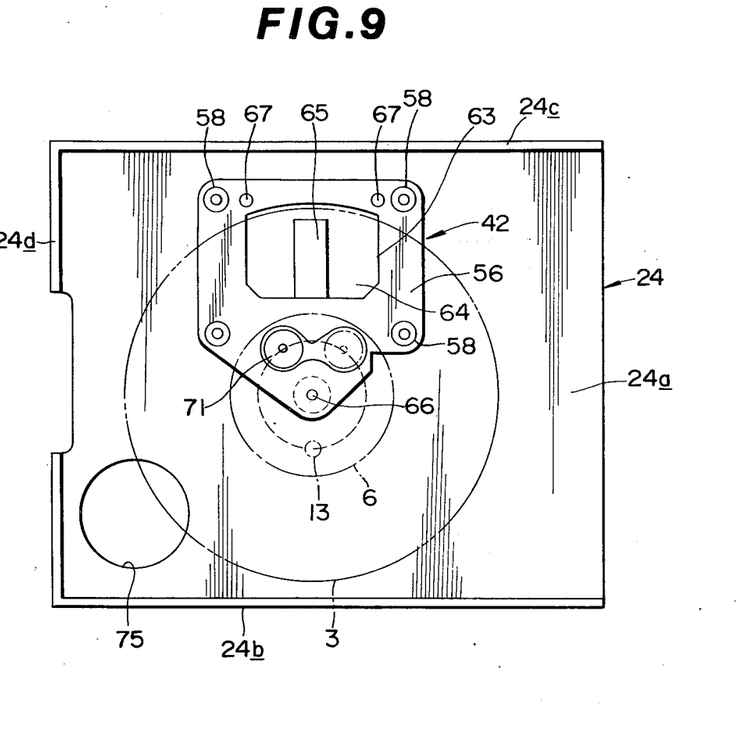
FIG. 9 is a bottom plan view of a cover and a positioning plate suspended therefrom in the apparatus of FIG. 5.
Figure 10:
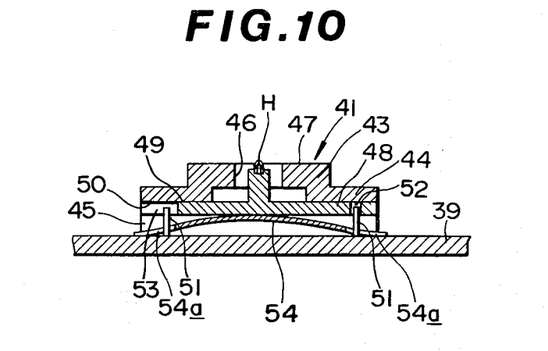
FIG. 10 is a fragmentary sectional view taken along the line V—V on FIG. 8 for particularly showing the mounting of a recording and/or reproducing head in the apparatus of FIG. 5.

As particularly shown on FIGS. 8 and 10, guide member 41 includes a plate-like raised portion 43 dimensioned to extend into window 4 of wall 2b of the operatively positioned cartridge 1 and being integral with a base portion 44 which is suitably secured on base member 22. Under raised portion 43, base portion 44 has a cavity 45 extending across guide member 41, and such cavity 45 communicates upwardly with an opening 46 which extends through raised portion 43 and is surrounded by a first smooth disc guiding surface 47 constituted by the top of raised portion 43. The head H projects upwardly through opening 46 for engagement with surface 3a of disc 3 in the operatively positioned cartridge 1 so that guiding surface 47, which lies in a plane corresponding to the desired plane of rotation of flexible disc 3, can be effective to regulate the position of disc 3 in the region surrounding the contact of head or heads H therewith. Preferably, as shown, the edge or margin of surface 47 is bevelled or chamfered, as at 47a on FIG. 8, so that surface 47 can contact disc 3 while the latter is rotated at high speed without damage to the surface of the disc. The opening 46 is shown to be elongated generally in the radial direction extending from the axis of shaft 34 so that head H can be moved therealong when head actuating device 38 is operated to change the circular track on disc 3 in which an information signal is being recorded or reproduced by head H.

As shown particularly on FIG. 10, in the embodiment of the invention presently being described, head H projects upwardly from a slider element 48 which extends under raised portion 43 and which has an upwardly facing surface 49 slidably engageable against a slider guiding surface 50 formed at the roof of cavity 45 and facing in a direction opposite to the first disc guiding surface 47 while being parallel with the latter. The pivoted arm 39 of head actuating device 38 extends through cavity 45 and, within the latter, has a pair of upwardly directed pins 51 at spaced apart locations along arm 39 engaging in a hole 52 and a longitudinally elongated slot 53, respectively, in the opposite end portions of slider element 48 for permitting vertical movements of slider element 48 relative to arm 39 while constraining element 48 and head H thereon to move with arm 39 in the direction parallel to base member 22. A leaf or bowed spring 54 has slots 54a at its opposite ends loosely receiving pins 51 and is thereby located between arm 39 and slider element 48 for urging the latter upwardly and thereby ensuring slidable engagement of the surface 49 on element 48 with the slider guiding surface 50 on guiding element 41.

Posts 55 extend upwardly from guide member 41 at spaced apart locations just outside raised portion 43 and are preferably equidistant from shaft 34. Thus, when a cartridge 1 is operatively positioned in apparatus 20, posts 55 extend upwardly through windows 4 radially outside the outer periphery of flexible disc 3 (FIG. 6). The posts 55 and the upper surface of head 34a on shaft 34 function, as hereinafter described in detail, as parts of spacing means by which positioning member 42 is precisely located in respect to guide member 41 when holding assembly 21 is in its loaded position.

Referring now to FIGS. 5-9, it will be seen that positioning member 42 is generally in the form of a plate 56 which depends from plate 24a of cover member 24 and is dimensioned to extend through the opening defined in frame member 25 between channels 25a and 25b, connection portion 25c and cross piece 25d. The suspension of positioning member 42 from cover member 24 is designed to permit limited movements of positioning member 42 toward and away from the cover member when holding assembly 21 is in its loaded position. For the foregoing purpose, plate 56 has four holes 57 extending therethrough adjacent its corners to slidably receive the shanks of headed pins 58, which shanks are longer than the thickness of plate 56. Screws 59 extend downwardly through respective holes 60 in plate 24a of cover member 24 and are threaded into tapped bores provided in the shanks of the respective head pins 58 (FIG. 7). Thus, headed pins 58 are secured by screws 59 to the underside of plate 24a of cover member 24 while plate 56 can move to a limited extent toward and away from plate 24a on the shanks of pins 58. A helical compression spring 61 is interposed between plate 24a of cover member 24 and plate 56 and seats in a circular recess 62 provided in the top surface of plate 56 for yieldably urging positioning member 42 downwardly relative to cover member 24 to the extent permitted by the engagement of plate 56 with the heads of pins 58.

Positioning member 42 is further shown to have a depending portion 63 integral with the underside of plate 56 and being dimensioned to extend into the window 4 of wall 2a of cartridge 1 when the latter is operatively positioned in response to movement of holding assembly 21 to its loaded position. The undersurface 64 of depending portion 63 has groove 65 of arcuate cross-section extending thereacross so as to substantially correspond with the path of movement of head H upon angular displacement of arm 39. Apart from such groove 65, surface 64 is smooth and flat so as to constitute a second disc guiding surface on positioning member 42 which may be operatively disposed in parallel, spaced confronting relation to first disc guiding surface 47 on guide member 41 for positioning the rotated flexible disc 3 therebetween in the region of the head or heads H.

Further, in accordance with the present invention, apparatus 20 is provided with spacing means associated with the guide and positioning members 41 and 42 for precisely, and preferably adjustably, determining the spacing between the first and second disc guiding surfaces 47 and 64, respectively, when holding assembly 21 is in its loaded position for operatively disposing positioning member 42. More specifically, in the illustrated embodiment of the invention, such adjustable spacing means includes a first screw 66 and a pair of second screws 67 (FIGS. 5, 6 and 8) adjustably threaded through plate 56 from above and respectively located so that, with holding assembly 21 in its loaded position, screw 66 is aligned with the head 34a of shaft 34, and screws 67 are aligned with posts 55 on guide member 41. As shown particularly on FIG. 8, plate 24a of cover member 24 has a large opening 68 through which there is exposed the portion of plate 56 in which screw 66 is threaded, and a pair of holes 69 located to register with screws 67. Thus, with holding assembly 21 in its loaded position, a screwdriver or similar tool can gain access to screws 66 and 67 through holes or openings 68 and 69, respectively, whereby to adjust such screws 66 and 67 in engagement with the upper surface of shaft head 34a and the upper surfaces of posts 50, respectively, as shown on FIG. 6. It will be apparent that such adjustments of screws 66 and 67 can raise plate 56 from the heads of pins 58 and thereby make it possible to precisely adjust the parallelism of guide surfaces 47 and 64 and the size of the gap therebetween independently of the position of cover member 24 relative to base member 22 in the loaded position of holding assembly 21.

Between the depending portion 63 of positioning member 62 and the adjustable spacing screw 66, plate 56 is formed with a recess or cutout 70 of substantially figure-eight configuration (FIGS. 5 and 8), and in which there is mounted a detecting coil 71 and an associated yoke structure 72, with lead wires 73 extending therefrom for leading a detected output from coil 71 to an associated electronic circuit (not shown). The detecting coil 71, in being positioned on the adjustable plate 56 of positioning member 42 adjacent adjustable spacing screw 66 which engages the head 34a of shaft 34 can be disposed with high precision relative to the magnetic detecting pin 13 in the hub 6 of disc 3 when such hub is seated on the surface 32a of turntable 32. By reason of the foregoing, it is possible for coil 71 to reliably and consistently detect the movement therepast of pin 13 and thereby provide a precise rotational phase detection in respect of disc 3. In other words, coil 71 and its associated circuit can reliably detect the completion of each revolution of disc 3 during which head H records an information signal, such as, a still image or picture signal, in a circular track on surface 3a.

As shown particularly on FIG. 8, plate 24a of cover member 24 and connecting portion 25c of frame member 25 have registering openings 74 and 75 which are located so that, when holding assembly 21 is in its loaded position for operatively positioning cartridge 1 in apparatus 20, scale 18 and the related index of device 19 are exposed through openings 74 and 75 for indicating the number of the circular record track on disc 3 at which head H is located for recording an information signal therein. Finally, as shown on FIG. 5, the apparatus 20 may have an indexing device 76 (FIG. 5) on base member 22 which is engageable with the track indicating device 19 of the operatively positioned cartridge 1. The indexing device 76, which forms no part of the present invention, is operated at the completion of each revolution of the operatively positioned disc 3, as detected by coil 71 and its associated circuit, to step or actuate track indicating device 19 so that the latter will indicate the next track number on scale 18. At the same time, of course, the detection by coil 71 of the completion of a revolution of disc 3, during which head H has recorded a still image signal in a circular track on surface 3a, suitably causes head actuating device 38 to angularly displace its arm 39 for shifting head H radially in respect to disc 3 to the position corresponding to the next track number being displayed or indicated by device 19.

The above described apparatus 20 embodying this invention operates as follows:

With holding assembly 21 initially in its receiving position shown on FIG. 5, a cartridge 1 is inserted into channels 25a and 25b of frame member 25 through the exposed open front ends of such channels and, in the course of such insertion, lug 31 acts on projection 5c for moving door member 5 to its opened position. As the insertion of cartridge 1 into frame member 25 continues, the leading end of the cartridge comes into contact with crosspiece 25d, at which time the cartridge is fully contained within the boundaries of frame member 25. Cover member 24 can then be pushed downwardly against the force of spring 27 relative to frame member 25 for enveloping the cartridge within cover member 24 and for extending depending portion 63 of positioning member 42 into window 4 of the upper wall 2a of the cartridge. Thereafter, further downward movement of cover member 24 is accompanied by corresponding downward movement of frame member 25 against the force of torsion spring 26, whereupon, holding assembly 21 moves as a unit to its loaded position for operatively positioning cartridge 1 relative to base member 22, with head 34a of stationary shaft 34 entering hole 7 in the hub 6 of disc 3. Simultaneously, the lower ends of spacing screws 66 and 67 come into engagement with the surface of head 34a and the upper ends of posts 55, as shown on FIG. 6, for accurately disposing positioning member 42 relative to guide member 41 at three points, that is, at the posts 55 and the shaft 34.

Upon the completion of the movement of holding assembly 21 to its loaded position, latch 30 engages in keeper 24e in cover member 24 for there securing the holding assembly. In such loaded position, raised portion 43 of guide member 41 extends into the window 4 in wall 2b of the operatively positioned cartridge 1 so that the portion of disc 3 exposed at windows 4 is disposed between sheet guiding surfaces 47 and 64 which thereby precisely determine the positioning of the disc surface 3a at the area of its contact by head H.

When turntable 32 is rotated in response to operation of motor 35, the magnetic coupling of hub 6 to turntable 32 causes similar rotation of disc 3 during which head H records a still image or other information signal in a respective circular track on surface 3a. Although disc 3 is desirably of relatively small diameter, the described cooperative association of surfaces 47 and 64 on guide member 41 and positioning member 42, respectively, is effective to precisely locate surface 3a relative to head H for ensuring reliable and accurate recording of the information signal.

As each revolution of disc 3 is detected by coil 71 with reference to the magnetic detecting pin 13 in hub 6, the position of head H is displaced to that of the next circular track on surface 3a, and indicating device 19 is indexed for displaying the number of such next track in which a still image signal will be recorded during the next revolution of disc 3.

During such displacements of head H by arm 39 for recording successive still image signals in different circular tracks on disc 3, slider element 48 carrying head H is guided by the engagement of its surface 49 with slider guiding surface 50 which is formed parallel to disc guiding surface 47 on guide member 47. Thus, during displacement of head H in the radial direction of disc 3, its contact pressure against surface 3a of disc 3 remains unchanged.

The adjustment of the gap between surface 64 on positioning member 42 and surface 47 on guide member 41 may be effected simply by a screwdriver engaged through holes 68 and 69 with adjusting screws 66 and 67. Such adjustments may be conveniently effected with holding assembly 21 in its loaded position with an operatively positioned cartridge 21 therein, and either during rotation of magnetic disc 3, or when the latter is at rest. Further, since detecting coil 71 is mounted on plate 56 for adjustable positioning member 42, the distance between such detecting coil 71 and the magnetic detecting pin 13 in hub 6 can also be readily varied through adjustment of screws 66 and 67.

Figure 11:
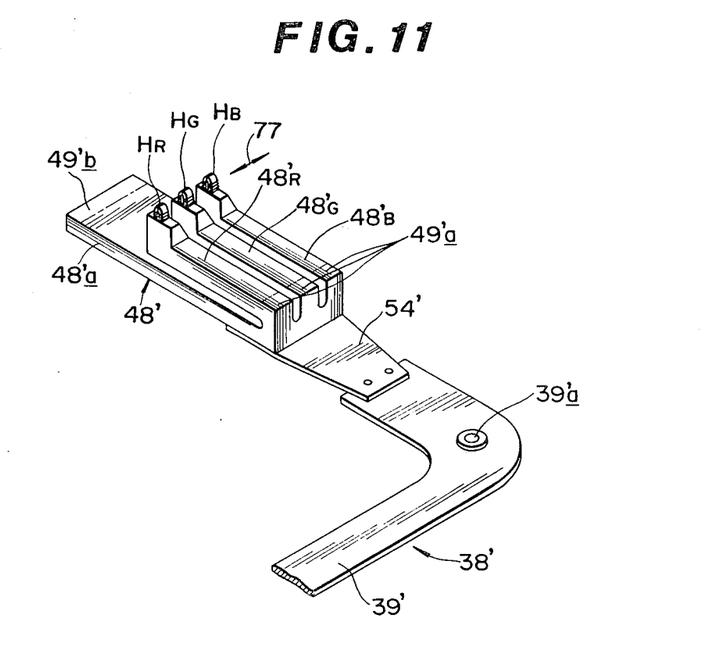
FIG. 11 is a detailed perspective view of a head assembly included in a flexible disc recording and/or reproducing apparatus according to another embodiment of the invention.
Figure 12:
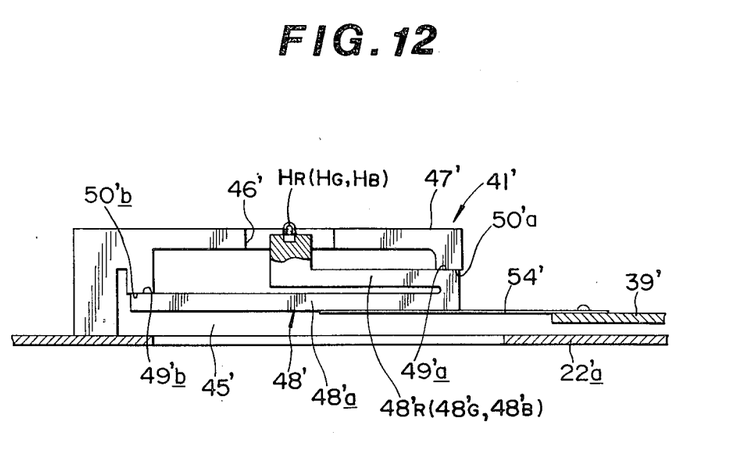
FIG. 12 is a side elevational view, partly in section, of the head assembly of FIG. 11, and showing the relationship of that head assembly to a guide plate therefor.

Referring now to FIGS. 11 and 12, it will be seen that parts of an apparatus according to another embodiment of the invention are there identified by reference numerals which are the same as those used for identifying the corresponding parts in FIG. 10, but with a prime appended thereto. More particularly, FIGS. 11 and 12 show a head assembly and an associated guide member 41' which are preferably used when color component signals, such as, color signals R, G and B or a luminance signal Y and color difference signals R-Y and B-Y, are to be recorded in individual or separate tracks on the flexible magnetic disc 3. As shown in FIGS. 11 and 12, three head $H_R$, $H_G$ and $H_B$ provided for recording respective color component signals in separate tracks are supported by a slider element 48' which, in this case, includes a plate-like base 48'$_a$ mounted, at one end, on a leaf spring 54' which, in turn, extends from a pivoted arm 39' of a head actuating device 38'. The slider element 48' is further shown to include three parallel tines 48'$_R$, 48'$_G$ and 48'$_B$ which are reverted over base 48' from one end of the latter and have upwardly directed free end portions on which heads $H_R$, $H_G$ and $H_B$ are respectively mounted. The upwardly facing surfaces of tines 48'$_R$, 48'$_G$ and 48'$_B$, adjacent the ends thereof which are integral with base 48'$_a$, constitute a first guiding surface 49'$_a$ on slider element 48', and a second guiding surface 49'$_b$ is defined at the top of base 48'$_a$ adjacent the end of the latter remote from spring 54'. As shown on FIG. 12, the guide member 41' for use with the slider element 48' has a cavity 45' into which slider element 48' extends with the previously described guiding surface 49'$_a$ and 49'$_b$ on slider element 48' being slidably engageable, from below, with guiding surfaces 50'$_a$ and 50'$_b$, respectively, formed on guide member 41'. Such guiding surfaces 50'$_a$ and 50'$_b$ are formed to be parallel with the disc guiding surface 47' at the top of guide member 41'. Furthermore, the various parts are dimensioned so that leaf springs 54' urge slider element 48' upwardly relative to guide member 41' for maintaining close contact of surface 49'$_a$ and 49'$_b$ against the downwardly facing surfaces 50'$_a$ and 50'$_b$. Thus, when arm 39' is angularly displaced about its pivot 39'$_a$ (FIG. 11) for displacing heads $H_R$, $H_G$ and $H_B$, in the direction of the double-headed arrow 77, which corresponds to the radial direction on disc 3, the engagement of the guide surfaces 49'$_a$ and 49'$_b$ on slider element 48'$_a$ with the respective guiding surfaces 50'$_a$ and 50'$_b$ on guide member 41' ensures that the heads extending through opening 46' in guide member 41' will maintain uniform contact pressure with the magnetic disc which is accurately positioned between disc guiding surface 47' on guide member 41', and a confronting surface similar to the surface 64 on positioning member 42 in the first described embodiment of the invention.

It will be appreciated that, apart from the manner in which the three heads $H_R$, $H_G$ and $H_B$ are mounted and guided in FIGS. 11 and 12, the embodiment of the invention for recording color component signals in separate or respective tracks may be otherwise similar to the embodiment having a single head H and which was previously described with reference to FIGS. 5-10.

Having described preferred embodiments of the invention with reference to the accompanying drawings, it is to be understood that the invention is not limited to those precise embodiments, and that various changes and modifications may be effected by one skilled in the art without departing from the scope or spirit of this invention as defined in the appended claims.

What is claimed is:

1. In a flexible disc recording and/or reproducing apparatus; the combination of drive means for rotating a flexible disc record medium, head means for recording and/or reproducing signals on a surface of the flexible disc record medium while the latter is rotated by said drive means, a guide plate having a disc guiding surface at least adjacent to said head means and confronting said surface of the rotated flexible disc record medium for conforming the latter to said disc guiding surface, a positioning plate which is operatively disposed in spaced confronting relation to said disc guiding surface with said rotated flexible disc therebetween in the region of said head means, and adjustable spacing means associated with said guide and positioning plates for adjustably and precisely determining the spacing between said guiding surface and said rotated flexible disc record medium when said positioning plate is operatively disposed.

2. A flexible disc recording and/or reproducing apparatus according to claim 1; in which said spacing means includes at least one pin extending from one of said guide and positioning plates normal to said guiding surface adjacent the outer periphery of said disc, and an abutment on the other of said plates for each said pin and engageable with an end surface of the respective pin when said positioning plate is operatively disposed.

3. A flexible disc recording and/or reproducing apparatus according to claim 2; in which said abutment is constituted by a screw adjustable relative to said other plate for adjusting said precisely determined spacing between said guiding surface and said rotated flexible disc record medium.

4. A flexible disc recording and/or reproducing apparatus according to claim 1; in which the flexible disc has a central hub with an aperture therethrough, said drive means includes a shaft adapted to extend through said aperture of the hub for centering the disc in respect to its axis of rotation, said shaft having an end surface facing in the same direction as said disc guiding surface, and said spacing means includes a spacing element carried by said positioning plate and engaging axially against said end surface of the shaft when said positioning plate is operatively disposed.

5. A flexible disc recording and/or reproducing apparatus according to claim 4; in which said spacing element is constituted by a screw adjustable relative to said positioning plate for adjusting said precisely determined spacing between said guiding surface and said rotated flexible disc record medium.

6. A flexible disc recording and/or reproducing apparatus according to claim 5; in which said spacing means further includes a pair of additional screws adjustable relative to said positioning plate at spaced locations along the outer periphery of the flexible disc record medium and extending normal to said guiding surface, and seat means for said additional screws on said guide plate so that said additional screws provide for the further adjustment of said precisely determined spacing between said guiding surface and said rotated flexible disc record medium.

7. A flexible disc recording and/or reproducing apparatus according to claim 4; in which said spacing means further includes a pair of additional spacing elements extending from said positioning plate at spaced locations along the outer periphery of the flexible disc record medium and means on said guide plate defining seats for said additional spacing elements when said positioning plate is operatively disposed, and said hub has indicating means movable in a circular plate about said shaft for indicating the rotational position of the flexible disc record medium; and further comprising detecting means mounted on said positioning plate so as to be precisely located in respect to said circular path for detecting said indicating means and generating a corresponding electrical signal.

8. A flexible disc recording and/or reproducing apparatus according to claim 1; in which said guide plate has an opening extending therethrough and being surrounded by said disc guiding surface, and said head means projects through said opening for recording and/or reproducing signals on said surface of the flexible disc record medium.

9. A flexible disc recording and/or reproducing apparatus according to claim 8; in which said guide plate has a slider guiding surface facing in a direction opposite to said disc guiding surface and being parallel with the latter; and further comprising a slider element having said head means mounted thereon and being movable substantially in a radial direction in respect to the flexible disc record medium, said slider element being in guiding engagement with said slider guiding surface.

10. A flexible disc recording and/or reproducing apparatus according to claim 9; further comprising a head actuating arm movable in a plane substantially parallel with said slider guiding surface, means constraining said slider element to move with said arm, and spring means interposed between said arm and said slider element for urging the latter against said slider guiding surface.

11. A flexible disc recording and/or reproducing apparatus according to claim 1; further comprising a second disc guiding surface on said positioning plate in parallel, spaced confronting relation to the first-mentioned disc guiding surface.

12. A flexible disc recording and/or reproducing apparatus comprising:
a substantially flat cartridge including opposed walls between which a flexible disc constituting a record medium is freely rotatable, said opposed walls having first aligned openings therein substantially centered in respect to said disc and aligned second openings extending, in the radial direction of said disc, between inner and outer effective limits of a recording surface on said disc;
a base member;
drive means extending from said base member and engageable with said disc through said first openings in said walls of the cartridge when the latter is in an operative position in respect to said base member for rotating said disc;
head means mounted on said base member for recording and/or reproducing signals on said surface of the disc while the latter is rotated by said drive means;
cartridge holding means movable in respect to said base member between a cartridge receiving position and a loaded position for disposing a cartridge in said holding means in said operative position;
a guide plate mounted on said base member and having a disc guiding surface at least adjacent to said head means;
a positioning plate mounted on said holding means and which, in said loaded position of the holding means, is in spaced confronting relation to said disc guiding surface; and
adjustable spacing means associated with said guide and positioning plates for adjustably and precisely determining the spacing between said disc guiding surface and said rotated flexible disc record medium when said holding means is in said loaded position;
said guide and positioning plates extending into said second openings of the walls of the cartridge when the latter is disposed in said operative position thereof by said holding means with said disc guiding surface confronting said surface of the rotated flexible disc and said rotated flexible disc record medium being therebetween in the region of said head means.

13. A flexible disc recording and/or reproducing apparatus according to claim 12; further comprising means mounting said positioning plate for movements in respect to said holding means in directions generally normal to said second disc guiding surface, and spring means interposed between said holding means and said positioning plate for urging the latter in the direction toward said guide plate in said loaded position of the holding means.

14. A flexible disc recording and/or reproducing apparatus according to claim 13; in which said spacing means includes at least one pin extending from one of said guide and positioning plates normal to said guiding surface adjacent the outer periphery of said disc, and an abutment on the other of said plates for each said pin and engageable with an end surface of the respective pin when said holding means is in said loaded position.

15. A flexible disc recording and/or reproducing apparatus according to claim 14; in which said abutment is constituted by a screw adjustable relative to said other plate for adjusting said precisely determined spacing between said guding surface and said rotated flexible disc record medium.

16. A flexible disc recording and/or reproducing apparatus according to claim 13; in which the flexible disc has a central hub with an aperture therethrough, said drive means includes a shaft adapted to extend through said aperture of the hub for centering the disc in respect to its axis of rotation, said shaft having an end surface facing in the same direction as said disc guiding surface, and said spacing means includes a spacing element carried by said positioning plate and engaging axially against said end surface of the shaft when said holding means is in said loaded position.

17. A flexible disc recording and/or reproducing apparatus according to claim 16; in which said spacing element is constituted by a screw adjustable relative to said positioning plate for adjusting said precisely determined spacing between said guiding surface and said rotated flexible disc record medium.

18. A flexible disc recording and/or reproducing apparatus according to claim 17; in which said spacing means further includes a pair of additional screws adjustable relative to said positioning plate at spaced locations along the outer periphery of the flexible disc and extending normal to said disc guiding surface, and seat means for said additional screws on said guide plate so that said additional screws provide for the further adjustment of said precisely determined spacing between said guiding surface and said rotated flexible disc record medium.

19. A flexible disc recording and/or reproducing apparatus according to claim 16; in which said spacing means further includes a pair of additional spacing elements extending from said positioning plate at spaced locations along the outer periphery of the flexible disc and means on said guide plate defining seats for said additional spacing elements when said holding means is in said loaded position, and said hub has indicating means movable in a circular path about said shaft for indicating the rotational position of the flexible disc; and further comprising detecting means mounted on said positioning plate so as to be precisely located in respect to said circular path when said holding means is in said loaded position for detecting said indicating means and generating a corresponding electrical signal.

20. A flexible disc recording and/or reproducing apparatus according to claim 12; in which said guide plate has an opening extending therethrough and being surrounded by said disc guiding surface, and said head means projects through said opening for recording and/or reproducing signals on said surface of the flexible disc.

21. A flexible disc recording and/or reproducing apparatus according to claim 20; in which said guide plate has a slider guiding surface facing in a direction opposite to said disc guiding surface and being parallel with the latter; and further comprising a slider element having said head means mounted thereon and being movable in respect to said base member substantially in a radial direction in respect to the flexible disc of the cartridge in said operative position, said slider element being in guiding engagement with said slider guiding surface.

22. A flexible disc recording and/or reproducing apparatus according to claim 21; further comprising a head actuating arm mounted on said base member for movement relative to the latter in a plane substantially parallel with said slider guiding surface, means constraining said slider element to move with said arm, and spring means interposed between said arm and said slider element for urging the latter against said slider guiding surface.

23. A flexible disc recording and/or reproducing apparatus according to claim 12; in which said holding means includes a cover member on which said positioning plate is mounted, and a receptacle frame member for receiving a cartridge in said receiving position and being movable with said cover member to said loaded position for retaining said cartridge in a predetermined position under said cover.

24. A flexible disc recording and/or reproducing apparatus according to claim 23; in which said receptacle frame member is movable to a limited extent relative to said cover member in response to movement of said holding means from said receiving position to said loaded position between an extended position, in which said positioning plate is withdrawn from said receptacle frame member to permit the insertion and removal of the cartridge therein without interference from said positioning plate, and a retracted position in which said positioning plate enters the cartridge received by said receptacle frame member.

25. A flexible disc recording and/or reproducing apparatus according to claim 24; in which said cartridge is substantially rectangular and said receptacle frame member has channel portions at its opposite sides opening at one end for slidably receiving opposed side edge portions of the cartridge during said insertion and removal of the latter, said cover member encloses said receptacle frame member in said retracted position of the latter relative to said cover member, and said cover member and receptacle frame member are mounted for pivoting relative to each other and relative to said base member about an axis extending across the other end of said receptacle frame member.

26. A flexible disc recording and/or reproducing apparatus according to claim 25; further comprising spring means urging said receptacle frame member to said extended position relative to said cover member, and in which said receptacle frame member engages said base member to move to said retracted position relative to said cover member upon movement of said holding means to said loaded position.

27. A flexible disc recording and/or reproducing apparatus according to claim 12; further comprising a second disc guiding surface on said positioning plate in parallel, spaced confronting relation to the first-mentioned disc guiding surface.

* * * * *